United States Patent [19]

Taylor

[11] 4,453,981

[45] Jun. 12, 1984

[54] DIRECT PREPARATION OF SLURRIES FOR CERAMIC BOARD

[75] Inventor: Mark P. Taylor, Painted Post, N.Y.

[73] Assignee: Corning Glass Works, Corning, N.Y.

[21] Appl. No.: 471,540

[22] Filed: Mar. 2, 1983

[51] Int. Cl.$^3$ ............................................. C09C 1/02
[52] U.S. Cl. .................................. 106/291; 106/306; 106/308 M; 106/309; 106/DIG. 3; 501/2; 501/3; 501/5; 501/12; 501/36; 501/151; 501/154
[58] Field of Search ................. 106/DIG. 3, 291, 309, 106/306, 288 B, 288 Q; 501/3, 5

[56] References Cited

U.S. PATENT DOCUMENTS 4,239,519 12/1980 Beall et al. ............................... 501/3
4,339,540 7/1982 Beall et al. ............................ 106/291

OTHER PUBLICATIONS

U.S. Bureau of Mines Bulletin 647, (1969).

Primary Examiner—Helen M. McCarthy
Attorney, Agent, or Firm—C. S. Janes, Jr.

[57] ABSTRACT

There is disclosed a method of producing a slurry composed of ion-exchanged, synthetic mica crystals dispersed in a polar liquid. The method comprises providing a synthetic, lithium and/or sodium, water-swelling body of selected crystal type, and dispersing the mica body in the polar liquid while simultaneously effecting an exchange of larger cations from a contacting source with lithium and/or sodium ions from the mica crystals. The synthetic mica body may be vigorously mixed in a dilute solution of the exchangeable ion source. Alternatively, the mica body may be disintegrated in a mixer, the exchangeable ion source added to form a paste and more liquid added to dilute the paste.

6 Claims, No Drawings

DIRECT PREPARATION OF SLURRIES FOR CERAMIC BOARD

BACKGROUND OF THE INVENTION

This invention is concerned with a direct method of producing a slurry composed of ion-exchanged, synthetic mica crystals dispersed in a polar liquid such as water. In particular, it is concerned with a method wherein two distinct operations are performed as part of one continuous step. Thus, a synthetic mica body is simultaneously dispersed in a liquid and subjected to an ion exchange procedure, thereby forming a dispersed slurry directly.

U.S. Pat. No. 4,239,519 (Beall et al.) is directed to the preparation of inorganic gels from which ceramic papers, films, boards, and coatings can be made. The basic method for preparing those gels contemplates three general steps: (1) a fully or predominantly crystalline body is formed containing crystals consisting essentially of a lithium and/or sodium, water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite; (2) that body is contacted with a polar liquid, desirably water, to cause swelling and disintegration of the body accompanied with the formation of a gel; and (3) the solid:liquid ratio of the gel is adjusted to a desired level depending upon the application therefor.

Papers, fibers, films, boards, and coatings are prepared from the gel. To impart good chemical durability thereto, these products are subsequently contacted with a source of large cations, commonly $K^+$, $Rb^+$, $Cs^+$, $NH_4^+$, $H_3O^+$, $Ca^{+2}$, $Sr^{+2}$, $Ba^{+2}$, $Pb^{+2}$, $Cu^+$, $Ag^+$ or organic polycations. This causes an ion exchange to take place between the large cations and the $Li^+$ and/or $Na^+$ ions from the interlayer of the crystals. Thereafter the ion-exchanged products are dried. Glass-ceramic bodies are statedly the preferred crystalline starting materials for gel formation.

The patent further discloses that the gel formed from the dispersed, synthetic, lithium and/or sodium mica may be ion exchanged prior to article forming. Thus, the gel is mixed with a source of a large exchangeable cation, such as a potassium chloride solution. This permits exchange of the lithium and/or sodium ions with the larger cation, and consequent formation of a floc composed of the ion exchanged mica crystals.

The floc thus formed may be separated from the liquid and processed, as by pressing and firing. Alternatively, it may be redispersed and further treated. Such procedures are described for example in campanion application Ser. No. 471,539, filed in the names of K. Chyung et al. and entitled "Process for Making Thick-Walled Ceramic Bodies from Synthetic Micas."

The process of first disintegrating the synthetic mica to form a gel, and then ion exchanging to flocculate the gel, involves two separate and distinct steps. This is technically effective and facilitates salt removal and washing. Nevertheless, it is time consuming and hence expensive. It would then be desirable to provide a simpler procedure.

PURPOSE OF THE INVENTION

A basic purpose is to provide a simple procedure for forming floc from a synthetic, lithium and/or sodium mica.

A particular purpose is to consolidate the separate steps of gel formation and ion exchange in one continuous operation.

Another purpose is to provide a method of directly producing a slurry of ion-exchanged, synthetic mica crystals from a crystalline, synthetic mica body.

A specific purpose is to simultaneously disperse the synthetic mica crystals and perform an ion exchange thereon.

SUMMARY OF THE INVENTION

The invention provides a direct, or one step, method of producing a slurry composed of ion-exchanged, synthetic mica crystals dispersed in a polar liquid, such as water, which comprises, providing a synthetic, lithium and/or sodium, water-swelling mica body that is fully or predominantly crystalline, the crystals being selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite, and dispersing the mica body in a polar liquid while simultaneously effecting an exchange of larger cations from a contacting source with lithium and/or sodium ions from the mica crystals.

In one embodiment, the exchangeable cation source is a salt solution, for example, potassium chloride (KCl) solution into which the mica body is placed to simultaneously disintegrate and ion exchange. In another embodiment, the mica body is placed in a polar liquid to disintegrate and a salt of a desired exchangeable ion is added to form a paste. More water is added to produce the desired concentration of solids.

The cationic source must be sufficient in amount to satisfy the ion exchange capacity of the mica. It should additionally provide sufficient excess to maintain the correct ionic strength. In the case of a lithium hectorite-potassium chloride combination, this is on the order of 200 millimoles of KCl per 100 grams of hectorite.

GENERAL DESCRIPTION OF THE INVENTION

As indicated, the basic synthetic mica material of this invention may be supplied as disclosed in U.S. Pat. No. 4,239,519.

Two methods are described therein for forming highly crystalline, glass-ceramic bodies. One, which utilizes a conventional three-step process for preparing glass-ceramic bodies, contemplates;
  (a) melting a batch comprising the necessary constituents in the proper stoichiometry to obtain a lithium and/or sodium, water-swelling mica selected from the group of fluorhectorite, hydroxyl hectorite, boron fluorphlogopite, hydroxyl boron phlogopite, and a solid solution among those and other structurally-compatible species selected from the group of talc, fluortalc, polylithionite, fluorpolylithionite, phlogopite, and fluorphlogopite;
  (b) simultaneously cooling the melt to a temperature at least within the transformation range therof and, typically, below the tranformation range, and forming a glass article therefrom; and (c) heat treating the glass article between about 700°–1200° C. to develop the desired crystals therein.

A second method, capable of producing a spontaneous glass-ceramic body, also involves three elements:

(a) melting a batch having the required ingredients in the proper stoichiometry to secure a lithium and/or sodium, water-swelling mica selected from members of the group referred to above, (b) simultaneously cooling the melt to a temperature between about 900°–1050° C. to shape the melt into a glass body and to cause phase separation and nucleation to take place therein; and then (c) further cooling the glass body to a temperature between about 700°–900° C. and maintaining that temperature for a sufficient length of time to develop the desired crystallization therein.

This latter method provides two practical advantages when compared with the conventional process for producing glass-ceramic articles, which process is founded in the reheating of precursor glass articles. First, the rate of production is much faster than in the conventional process. Second, less stable glasses, i.e., glass compositions which are prone to devitrify readily, can be utilized. Unfortunately, the method does not permit close control of crystal size. Further, undesirable crystal phases may develop, and volatilization losses may be incurred. This requires more care to insure essentially complete gelation and flocculation of the crystalline material.

The patent further discloses a method which involves the hydrothermal treatment of anhydrous glasses and glass-ceramics to form analogous hydroxyl micas. In general, the method is similar to the glass-ceramic methods, except that the compositions are usually low-fluoride or fluoride-free. Also, the body formed is subsequently exposed to a water-containing, gaseous atmosphere of at least 50% relative humidity at temperatures in the range of 200°–400° C. for sufficient time to develop crystals that are the hydroxyl equivalents of the effective lithium and/or sodium micas.

Finally, it is disclosed in Bureau of Mines Bulletin 647 (1969) that a sintered reaction product may be used to prepare a gel. For present purposes then, the basic ingredient is a vitreous material fully or predominantly composed of crystals of a synthetic, lithium and/or sodium, water-swelling mica selected from the group of fluorhectorite, hydroxyl hectorite, boron fluorphlogopite, hydroxyl boron phlogopite, and a solid solution among those and between those and other structurally-compatible species selected from the group of talc, fluortalc, polylithionite, fluorpolylithionite, phlogopite, and fluorphlogopite.

A crystalline body, produced in accordance with the patent disclosure, is placed in a polar liquid to disintegrate and form a gel in the process. The gel may thereafter be introduced into a solution of larger exchangeable cations to effect an exchange of large cations for lithium and/or sodium from the mica crystals. Incident to the ion exchange is flocculation of the gel. The floc may be washed, drained and redispersed to form a suitable slurry for subsequent processing.

The present invention provides a simple, direct procedure whereby a suitable slurry is provided in one continuous step. A crystalline mica body is disintegrated, dispersed, and ion exchanged to create the desired floc dispersion. It is based on my discovery that the ion exchange can take place concurrently with disintegration of the mica body. Further, essentially similar results, in terms of the slurry formed, are achieved, provided care is taken to regulate the amount of ion exchange material in the mix.

In accordance with one embodiment of the invention, a dry glass-ceramic that is essentially a crystallized synthetic mica is provided. This is added to a dilute salt solution containing the exchangeable ion, e.g., a potassium chloride (KCl) solution and vigorously mixed, as by milling in a high speed mixer. The concentration of the salt solution must be adjusted to (1) satisfy the ion exchange capacity of the mica and (2) provide excess electrolyte to maintain proper ionic strength for dispersion of the floc.

In the case of a KCl solution and a lithium fluorhectorite mica combination, the ion exchange requires 115 meq/100 grams of hectorite. When the ionic strength condition is also met, good results are attained with about 200 millimoles of KCl per hundred grams of the mica.

In a second approach, the dry glass-ceramic is placed in liquid in a high shear mixer and milled. The mixer is opened and a controlled amount of a salt such as KCl (200 millimoles/100 grams hectorite as before) is added. Further mixing forms a paste which is then diluted with water and further mixed to provide the concentration desired in the final slurry.

It will be appreciated that references to specific materials are simply exemplary. Thus, other micas than hectorites may be employed as indicated. Also, other exchangeable large cations may be employed. In this regard, reference is made to the disclosure in the Beall et al. patent, and also in two concurrent applications, Ser. No. 461,571 filed in the names of S. N. Hoda and A. R. Olszewski and entitled "Organic-Inorganic Composites Containing Synthetic Mica, " and Ser. No. 461,672 filed in the name of S. H. Wu and entitled "Organic-Inorganic Composites of Neutralized Polyelectrolyte Complexes." In such cases, adjustments in material contents will be made to provide comparable concentrations.

DESCRIPTION OF PREFERRED EMBODIMENTS

In the following laboratory studies, a glass-ceramic consisting essentially, in parts by weight as calculated from the original batch ingredients, of $SiO_2$: 64.4
MgO: 10.8
$Li_2O$: 8.0
$MgF_2$: 16.7 comprised the starting material. That composition represents stoichiometric lithium fluorhectorite. The batch components therefor were compounded, ballmilled together, and then charged into a platinum crucible. A lid was placed onto the crucible, and the crucible introduced into a furnace operating at 1450° C. After melting for five hours, the molten glass was poured onto a steel plate to produce a glass slab about 0.5" in thickness. This slab was immediately transferred to an annealer. The glass slab was converted to a glass-ceramic body utilizing the conventional method therefor, viz., reheating a precursor glass body. In this instance, the glass slab was heated to 800° C. at a rate of about 5° C./minute and held at that temperature for four hours. Electron microscopic examination of the body showed it to be highly crystalline with the crystals, themselves, being fine-grained (<5 microns). X-ray diffraction analysis determined the principal crystal phase to be lithium fluorhectorite with minor amounts of quartz, amphibole, and lithium disilicate.

Glass-ceramic of the above-delineated composition (predominant crystal phase lithium fluorhectorite) was immersed into an aqueous KCl solution and milled in a high shear mixer. The concentration of the KCl solution was adjusted to allow for two factors: (a) the ion exchange capacity of the fluorhectorite (100 milliequivalents/100 grams fluorhectorite); and (b) an excess of electrolyte (the KCl solution) to maintain the proper ionic strength, that is about 200 millimoles of KCl/100 grams fluorhectorite.

TABLE I illustrates the effect of KCl concentration on (1) the potassium absorbed by the fluorhectorite, (2) the lithium released; and (3) the time, in minutes, demanded to drain the excess solution with a reduced pressure of 20 mm Hg. All concentrations reported in TABLE I are expressed in terms of milliequivalents per 100 grams of dry fluorhectorite. The ion exchange capacity for this technique appears to level out at about 115 milliequivalents/100 grams.

TABLE I

| Initial Potassium Content | Potassium Absorbed | Lithium Released | Drain Time (minutes) |
|---|---|---|---|
| 100 | 98 | 73 | >30 |
| 150 | 115 | 141 | 9 |
| 200 | 114 | 143 | 7 |
| 250 | 115 | 143 | 5 |

Thick-walled, flat bodies, commonly referred to as boards, were prepared by pressing and drying floc. One set was prepared from floc obtained in accordance with the present invention as just described. A comparison set was obtained in the conventional manner of gel-forming and ion-exchanging in separate steps.

The boards prepared by the direct method disclosed herein manifested less laminar character than the conventional boards, and hence were less prone to surface spalling. They were also more open or porous, thus facilitating impregnation with another material. Finally, the present boards provided a smoother surface finish. Light microscopic examination of the slurry showed it to consist of separated individual flakes exhibiting many crystal outlines. This circumstance is believed to indicate that the flakes have not been broken apart.

Yet another approach to preparing slurries suitable for filter forming of bodies of different configurations involves three steps integrated into one continuous operation. The following recitation is illustrative thereof: (a) glass-ceramic of the above-described composition was immersed into deionized water and milled in a high shear mixer; (b) a controlled amount of KCl solution (desirably about 200 millimoles KCl/100 grams fluorhectorite) was added thereto with thorough mixing to produce a thick paste; and (c) deionized water was added with additional milling to yield a slurry of a desired viscosity.

Light microscopic study of the slurry revealed a microstructure similar to that existing in the slurries prepared via the conventional multi-step method; viz., very thin individual flakes aggregated together in a patchwork to form larger flocs. The degree of aggregation appeared to be a function of the ionic environment, i.e., higher ionic strengths produced more aggregation until the entire system became a continuous floc.

Ion exchange data for the slurries prepared in accordance with this process are listed in TABLE II. A comparison with TABLE I indicates that somewhat more potassium is absorbed in this method, but considerably more lithium is released. This circumstance may be the result of a hydronium ion-for-lithium ion exchange or, perhaps, dissolution of the fluorhectorite during the gelation step. Drain times for this series were not measured, but appeared to be generally similar to those reported in TABLE I.

TABLE IV

| Initial Potassium Content | Potassium Absorbed | Lithium Released |
|---|---|---|
| 100 | 96 | 129 |
| 150 | 125 | 169 |
| 200 | 128 | 173 |
| 250 | 129 | 178 |

Because the inventive method of the present invention involves fewer process steps, cost savings are possible vis-a-vis the more detailed "conventional" process. These latter techniques may yield products containing residual electrolyte salts as impurities. However, if such residual salts become a problem, they may be removed or exchanged by a wash step, for example, by washing with a dilute $AlCl_3$ solution.

Related Literature

It is believed that the most closely related literature is comprehended by the Beall et al. patent and the Bureau of Mines Bulletin, both mentioned earlier, and the various references made of record in these two sources.

I claim:

1. A method of producing a slurry composed of ion-exchanged, synthetic mica crystals dispersed in a polar liquid which comprises providing a synthetic, lithium and/or sodium, water-swelling mica body that is fully or predominantly cryastalline, the crystals being selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite, and high shear mixing the mica body in a polar liquid containing a contacting source of larger exchangeable cations to simultaneously disintegrate the mica and effect an exchange of larger cations from the contacting source with lithium and/or sodium ions from the mica crystals, said slurry consisting of very thin individual flakes aggregated together in a patchwork to form larger flocs.

2. A method in accordance with claim 1 wherein the synthetic mica is a lithium fluorhectorite.

3. A method in accordance with claim 1 wherein the source of exchangeable cations is a potassium salt.

4. A method in accordance with claim 1 wherein the polar liquid contains a predetermined amount of exchangeable cation sufficient to exchange with the lithium and/or sodium of the mica and to control ionic strength.

5. A method in accordance with claim 1 wherein the mica body is milled with a liquid in a mixer, the source of exchangeable cations is added to the mixer to form a paste, and further liquid is added to provide a desired level of solids in the slurry.

6. A method in accordance with claim 1 wherein the mica is a lithium and/or sodium fluorhectorite, the source of large cation is potassium chloride, and the latter is employed in an amount on the order of 200 millimoles per hundred grams of hectorite.

* * * * *